United States Patent [19]

Padwa

[11] 4,240,120
[45] Dec. 16, 1980

[54] CASSETTE-TO-CASSETTE DUPLICATOR

[76] Inventor: Murray N. Padwa, 18710 Canasta St., Tarzana, Calif. 91356

[21] Appl. No.: 4,461

[22] Filed: Jan. 18, 1979

[51] Int. Cl.³ .......................... G11B 5/86; G11B 15/68
[52] U.S. Cl. ........................................... 360/15; 360/92
[58] Field of Search ................ 360/15, 92, 96.1, 96.4; 179/100.11; 242/197–200, 181; 214/8.5 A, 8.5 F

[56] References Cited

U.S. PATENT DOCUMENTS

| 3,560,666 | 2/1971 | Bookman | 360/92 |
| 3,744,803 | 7/1973 | Bazzy | 360/15 |
| 3,767,206 | 10/1973 | Rehklau et al. | 360/15 |
| 3,833,224 | 9/1974 | Haake | 360/92 |
| 3,886,591 | 5/1975 | Bettini | 360/92 |
| 3,936,874 | 2/1976 | Dusanek | 360/92 |
| 3,996,616 | 12/1976 | Sturrock et al. | 360/92 |
| 4,072,991 | 2/1978 | Kok | 360/92 |
| 4,092,685 | 5/1978 | Sander et al. | 360/92 |
| 4,141,045 | 2/1979 | Sheehan | 360/15 |

Primary Examiner—Alfred H. Eddleman
Attorney, Agent, or Firm—Allan M. Shapiro

[57] ABSTRACT

The cassette-to-cassette duplicator is for the one-at-a-time automatic duplication of successive blank tape cassettes from a master tape cassette. The duplicator is made up of a continuous feed magazine of blank cassettes; a changer which moves the cassettes from the magazine to the tape transport and, after duplication, away from the tape transport; and the tape transport itself, which winds the tape within the two cassettes while playing back the master tape and recording a duplicate.

22 Claims, 16 Drawing Figures

CASSETTE-TO-CASSETTE DUPLICATOR

BACKGROUND OF THE INVENTION

1. Field of the Invention

This invention is directed to an automatic cassette duplicating machine which successively automatically removes blank cassettes from a magazine, positions the blank cassettes in the tape transport, records the duplicate tape, discharges the duplicate, and performs the foregoing operations sequentially repetitively.

2. Description of the Prior Art

There have been a number of efforts to devise structures whereby one cassette after another can be brought into a tape transport for use. Usually, these structures are for the successive play of pre-recorded cassette tapes. With the increasing use of cassettes as music tapes, there has been a desire to provide automatic changers so that such music tapes can be successively played. Among the efforts to provide a suitable device for this purpose is the apparatus described in U.S. Pat. No. 3,667,624. The prior cassette-changing structures have not been economically successful because of their complexity and have not been suitable for cassette-to-cassette duplication.

The usual equipment for tape duplication is apparatus wherein a large number of duplicates are made at one time by running and recording many duplicates at one time and recording them all at the same time from a single master. That type of equipment is widely used, but is not feasible for, and does not have the recording flexibility inherent in, automatic, unattended, sequential, one-at-a-time recording of duplicates from a master while both the master tape and the duplicate tape are disposed in cassette housings.

SUMMARY OF THE INVENTION

In order to aid in the understanding of this invention, it can be stated in essentially summary form that it is directed to a cassette-to-cassette duplicator which is comprised of a magazine assembly, a changer assembly which accepts duplicate cassettes from the magazine and moves them to recording position in the tape transport and thereafter moves them out of the duplicator, and a tape transport assembly which advances the master tape and the cassette tape being recorded for respective playback and recording. For convenience and ease of description of the inventive mechanics, the term "duplicate cassette" will be used herein from time to time to refer to a cassette either containing either blank or used tape which is available to receive the information borne by the master tape in the master tape cassette, or else containing the next stage tape upon which the master tape information then has been recorded.

It is an object of this invention to provide an automatic in-cassette tape duplicating machine which has a magazine for supplying blank cassettes for feeding into the changer of the duplicator. It is a further object to provide a cassette-to-cassette duplicator system which is supplied with blank cassettes by a removable magazine which can be preloaded with blank cassettes to be supplied to the duplicator. It is a further object to provide a changer which accepts cassettes one at a time from the magazine and moves them from the magazine to the tape transport of the duplicator. It is a further object to provide a changer which handles cassettes oriented at a small angle from the vertical with the cassette-recording openings at the top. It is a further object to provide a tape transport which receives cassettes oriented at a small angle to the vertical, with the recording openings as the top of the cassette, and rotates them on a cassette carriage to the vertical position and, with this rotation, engages the cassette on the tape-winding drive mechanism.

It is a further object of this invention to provide a cassette-to-cassette duplicator which successively and one at a time records upon blank cassettes from a master tape. It is another object to provide a cassette-to-cassette duplicator which is small in size and is convenient to use in business establishments and offices where a few duplications are required at a time. It is another object to provide a cassette-to-cassette duplicator which is simple of operation so that office personnel who are trained in office equipment can easily learn to operate the duplicator without the need for special or professional tape duplicator skills. It is another object to provide a cassette-to-cassette duplicator which will duplicate a predetermined multiplicity of cassettes from a single master cassette without attendance by or manual intervention by an operator, except to initiate the action of the duplicator.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
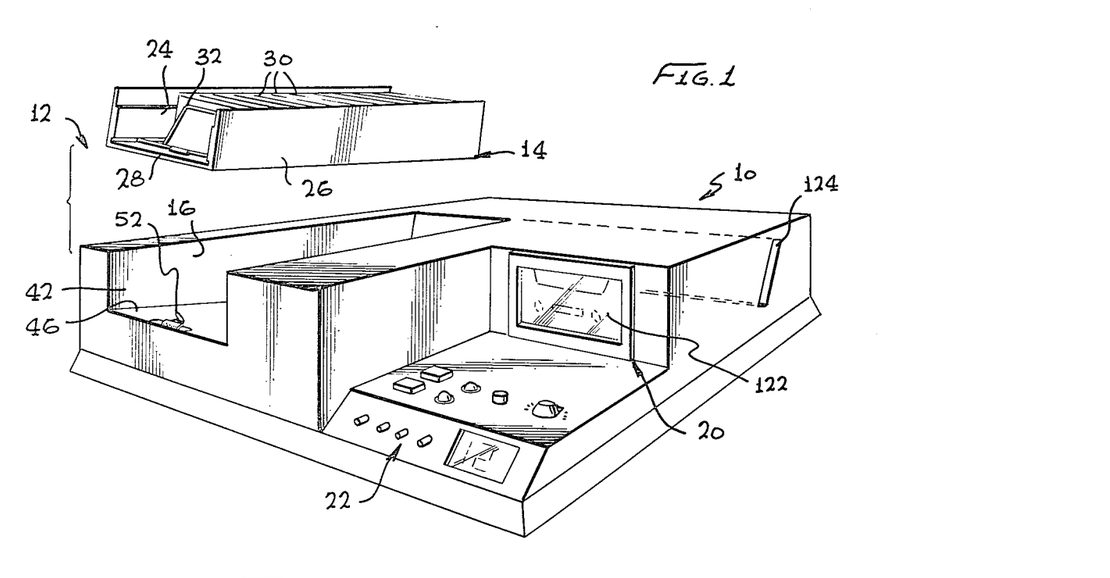
FIG. 1 is a perspective view of the preferred embodiment of the cassette-to-cassette duplicator of this invention.
Figure 2:
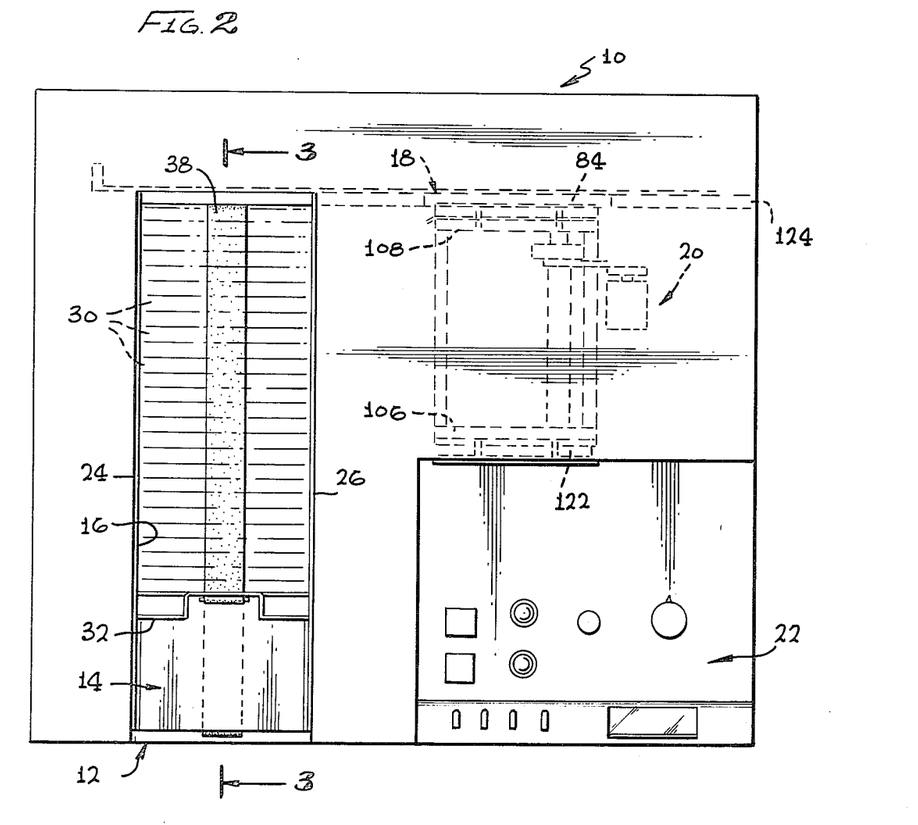
FIG. 2 is a plan view thereof showing some of the tape transport mechanism in dotted lines.
Figure 6:
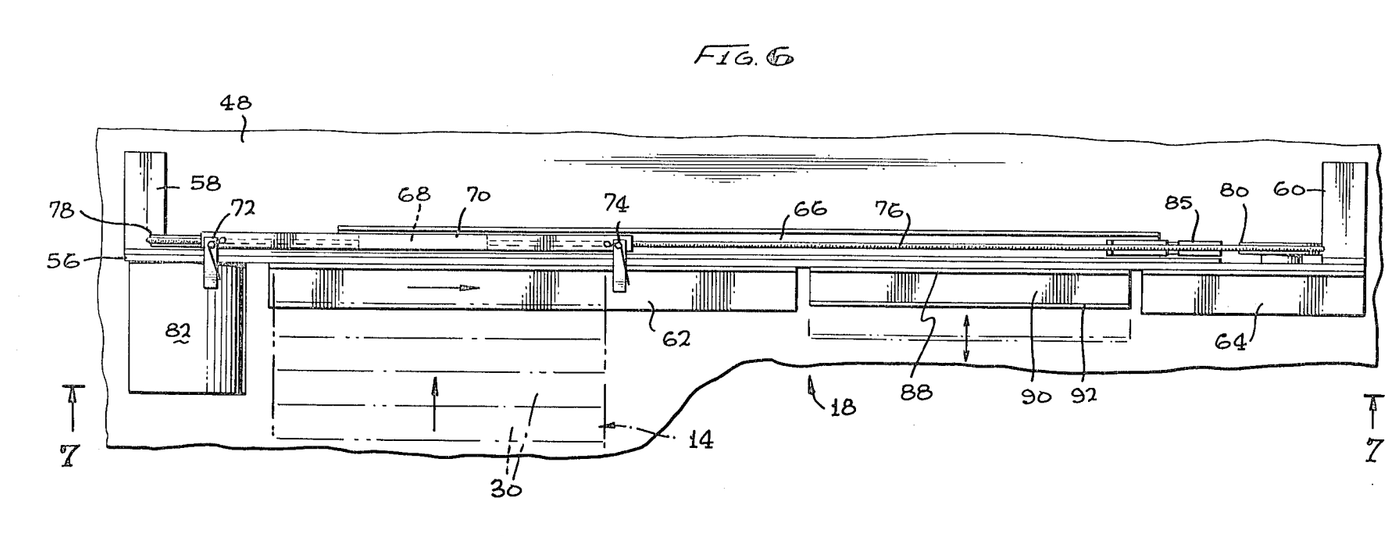
FIG. 6 is a view of the changer assembly, looking downward on the track.

The cassette-to-cassette duplicator of this invention is generally indicated at 10 in FIG. 1. Duplicator 10 is made up of four major functional portions. Magazine assembly 12 is comprised of magazine 14 and magazine receiver 16, see FIGS. 1, 2 and 3. The magazine assembly supplies successive cassettes to changer assembly 18 shown in dashed lines in FIG. 2 and shown in detail in FIGS. 6, 7 and 9. Tape transport 20 is shown in dotted lines in FIG. 2, and a portion of it is shown in detail in FIGS. 8a and 8b.

The cassette-to-cassette duplicator 10 is totally modular with respect to the magazine assembly, changer assembly and tape transport. Each assembly can be completely manufactured and tested separately from the others, and there is free interchange of assemblies from one duplicator to the next. In addition to these mechanical assemblies, the cassette-to-cassette duplicator of this invention is provided with an electronic control and reproduction system which predetermines the number of duplicates to be made and which controls the changer and tape transport to move cassettes into recording position at the appropriate time and to do the recording thereon. The electronic system of the cassette-to-cassette duplicator is not a part of this invention, but conventional structures can be applied to provide the electronics to accomplish these functions. The electronics can be located in association with the electronic control and signal devices generally indicated at 22 in FIGS. 1 and 2.

Figures 3, 4, 5:
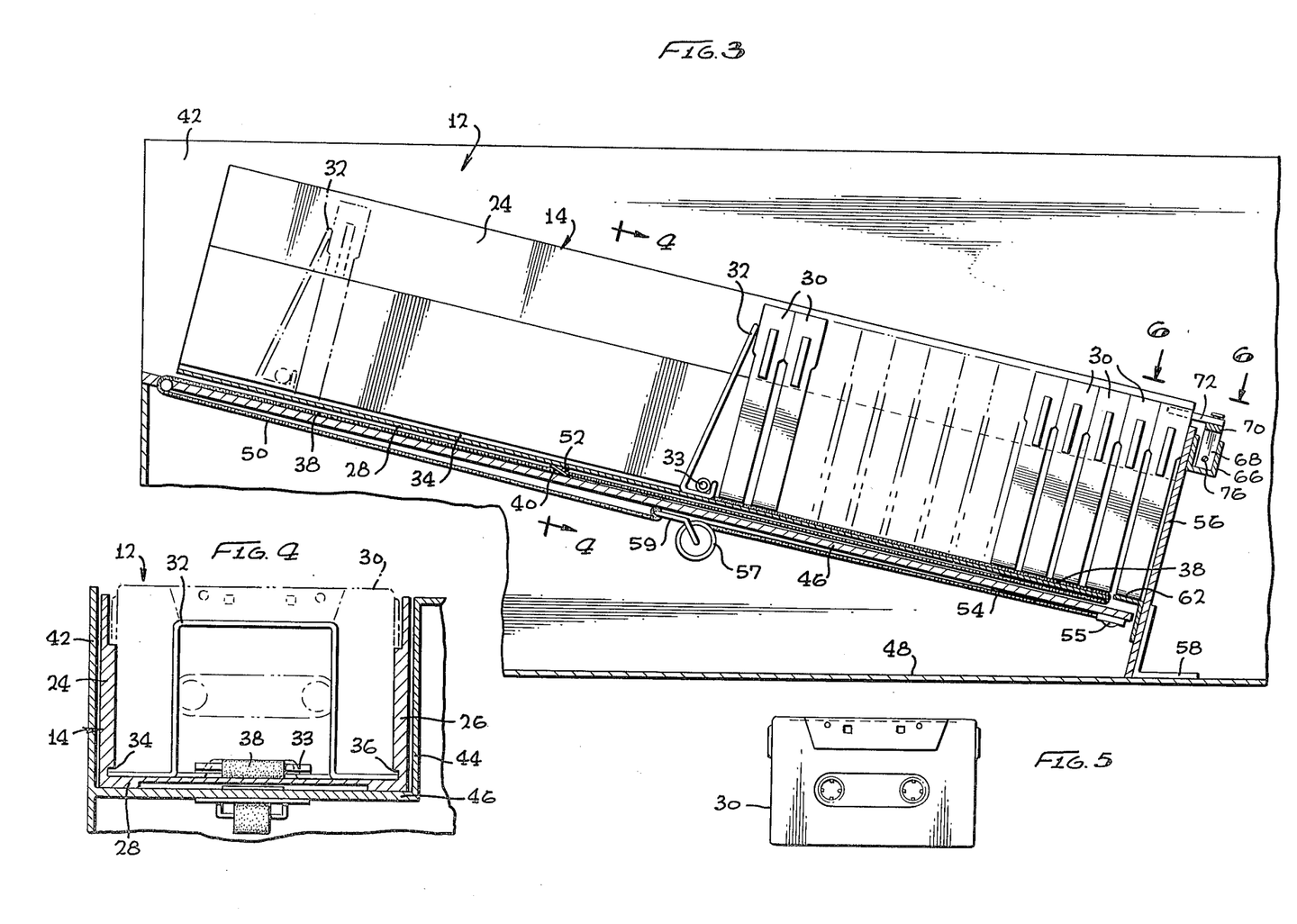
FIG. 3 is an enlarged section looking leftward and taken vertically through the magazine assembly of the duplicator of FIG. 1.
FIG. 4 is a section through the magazine assembly as seen along the line 4—4 of FIG. 3.
FIG. 5 is an elevational view of a tape cassette.

Referring principally to FIGS. 1, 2, 3 and 4, it is seen that magazine 14 is made up of sidewalls 24 and 26 joined by floor 28. This structure defines a U-shaped channel of suitable dimensions that a cassette can be positioned therein. Cassette 30 is indicated in FIGS. 3 through 5 and is seen to be received between the sidewalls 24 and 26 with the open edge of the cassette facing upwardly. The open edge of the cassette has the conventional access openings therein for advancing the tape and access for record and playback heads to the tape. Cassette follower 32 is engaged in tracks 34 and 36, which are longitudinal slots at the base of the sidewalls. Cassette follower 32 can thus slide longitudinally of the cassette magazine 14 for following the cassette therein toward the right end, as seen in FIG. 3. The right end is the feed end of the magazine. A flat, flexible conveyor belt 38 is looped around the end of floor 28 of magazine 14. Cassette follower 32 is connected to the belt by a retaining pin 33, and the belt carries an eye 40 thereon.

Magazine receiver 16 has sidewalls 42, 44 and bottom 46 which are spaced to receive magazine 14. Bottom 46 is angled downwardly about 10 degrees with respect to base plate 48 on which each of the assemblies is mounted in the duplicator.

Tension cable 50 extends around the upper end of bottom 46 and carries hook 52 thereon. Spring 54 is attached at 55 to the underside of bottom 46 and winds up on spool 57 to give tension to the cable 50, preferably with substantially constant force. Yoke 59 carries spool 57 freely therein, and cable 50 is secured to yoke 59. When magazine 14 is inserted into magazine receiver 16, follower 32 is all the way back to the left or upper end as indicated by the phantom illustration in FIG. 3. In fact, it can be latched in this position for insertion of the magazine 14 into the magazine receiver 16 or for adding additional blank cassettes into the magazine when it is in place. With cassette follower 32 retracted to the left end, then eye 40 is to the right end of the magazine under the floor 28. At the same time, the magazine 14 being out of the magazine receiver 16, hook 52 is pulled all the way up to the upper left end of magazine receiver bottom 46 to the position shown in FIG. 1. As the magazine is inserted into the magazine receiver, the hook is placed in the eye so that insertion of the magazine extends spring 54 to apply tension to tension cable 50 and thus conveyor belt 38 to feed cassettes 30 to the lower, outlet end of the magazine. Note that the cassette follower 32 is urged to the right to keep the cassettes in an upright position, and not to force the cassettes out of the end; the spring force is light to prevent binding of the cassettes at the discharge end, and the cassettes rest upon the belt in frictional engagement with the belt for conveyance by the belt. When the magazine is exhausted, cassette follower 32 can be manually pulled back, and new cassettes can be placed in the magazine, or the magazine can be removed and a new, full magazine inserted in its place. By this means, cassettes are successively fed to the lower end of the magazine to be picked up by the changer assembly 18 for feeding.

As is seen in FIGS. 6, 7, 8a and 8b, changer assembly 18 has guide plate 56 mounted on base plate 48 by means of brackets 58 and 60. Guide plate 56 is at approximately an 80 degree angle with respect to base plate 48 which forms the reference support of duplicator 10. Guide plate 56 is tilted back as the duplicator is viewed from the front. Guide plate 56 is normal to the bottom of magazine 14 and magazine receiver 16. Track 62 is mounted on guide plate 56 in line with the bottom 28 of magazine 14, see FIG. 3. In this way, the magazine delivers a cassette against guide plate 56 onto track 62. An outlet track 64 is also mounted on guide plate 56 to guide cassettes away from the cassette carriage of changer assembly 18.

Figure 8A:
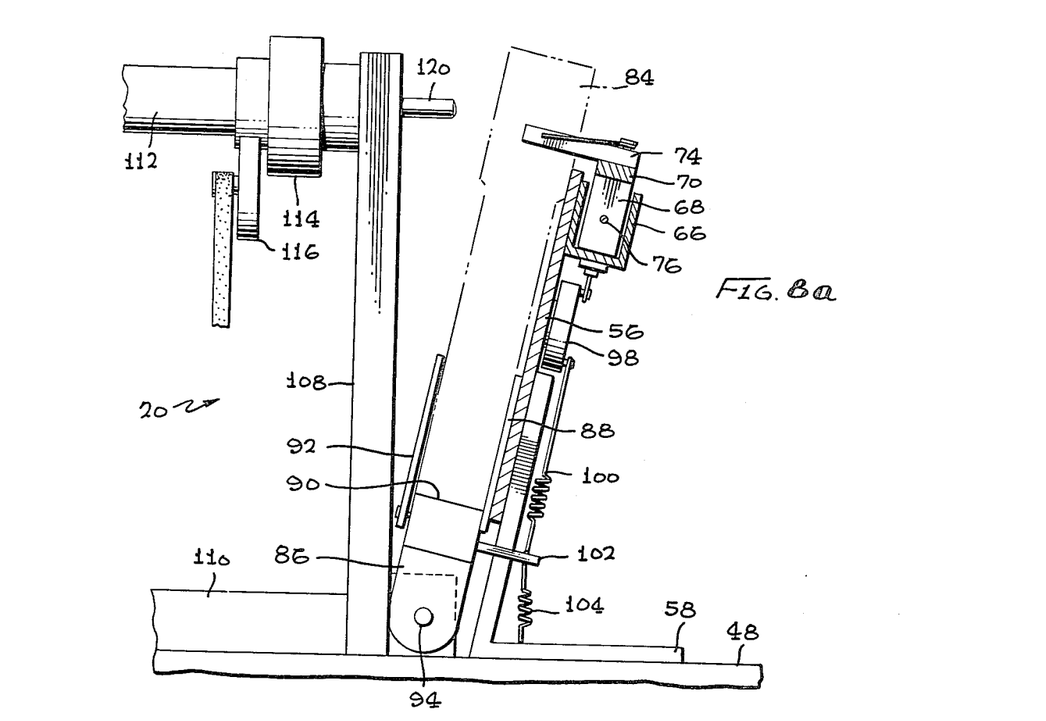
FIG. 8a is an enlarged end view of the cassette carriage in the cassette transfer position, as seen along the line 8a, b—8a, b in FIG. 7.
Figure 8B:
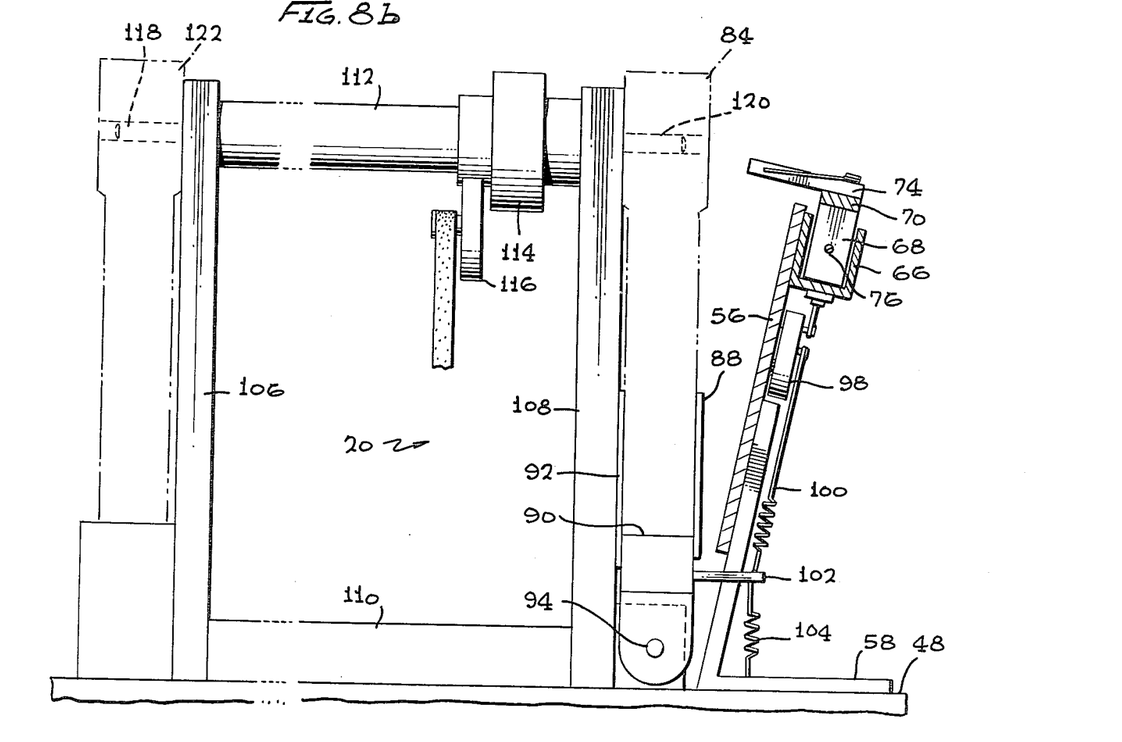
FIG. 8b is a view similar to 8a showing the cassette carriage in the tape transport position.

Channel 66, particularly see FIGS. 8a and 8b, is secured open-side up on the back of guide plate 56. Shuttle 68 slides therein. Shuttle 68 has cap 70 thereon which carries fingers 72 and 74 thereon. Fingers 72 and 74 are pivoted on the cap and are spring-stressed in the clockwise direction and have stops thereon which stop the fingers when they are positioned perpendicular to cap 70, see FIG. 9. Fingers 72 and 74 act like pawls, and they can engage upon cassettes which lie against the guide plate and rest on track 62.

Drive cable 76, see FIGS. 6, 7, 8a 8b and 9, is connected to shuttle 68 and extends around pulleys 78 and 80. Pulley 80 is an idler pulley, while pulley 78 is driven by motor 82. Motor 82 is a reversible motor which is controlled by the duplicator electronics. Limit switches 83 and 85, see FIG. 9, signal the end positions of the shuttle for stopping and reversing the shuttle.

Figure 11A:
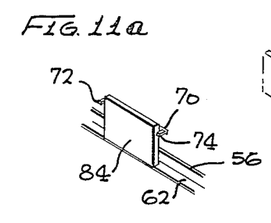
FIGS. 11a, 11b, 11c, 11d and 11e show sequential motion of the cassettes during successive operation of the cassette-to-cassette duplicator of this invention.
Figure 11B:
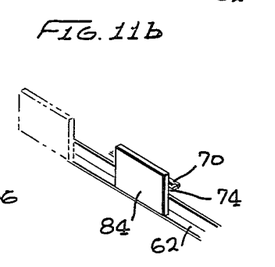

When the shuttle is in the leftmost position illustrated in FIG. 11a, the left finger 72 engages on a cassette at the front of magazine 14, for example, cassette 84 seen in FIG. 11a. Upon cycling of the changer assembly 18, finger 72 engages the rear edge of cassette 84 and advances the cassette to the right, as seen in FIGS. 6, 7, 11a and 11b. The stroke of the shuttle is sufficiently long to deliver the cassette in question to the tape transport cassette carriage 86, see FIGS. 6, 7, 8a and 8b.

Tape transport 20 includes tape transport cassette carriage 86, which is in the form of a channel which is open upwardly. Cassette carriage 86 has a back wall 88 which lies substantially in line with guide plate 56 when cassette carriage 86 is in its release position. Bottom 90 lies substantially in line with track 62 when the cassette carriage is in the rear, release position. Therefore, as cassette 84 is advanced, it is advanced into the channel shaped receptacle of the cassette carriage. Front plate 92 resiliently engages on the front of the cassette to lightly hold it in place. (See FIG. 8a.) The endwise positioning of the cassette as it is advanced into cassette carriage 86 is not critical, but adjustment of limit switch 85 controls the stop position by controlling the end position of the shuttle stroke.

Figure 7:
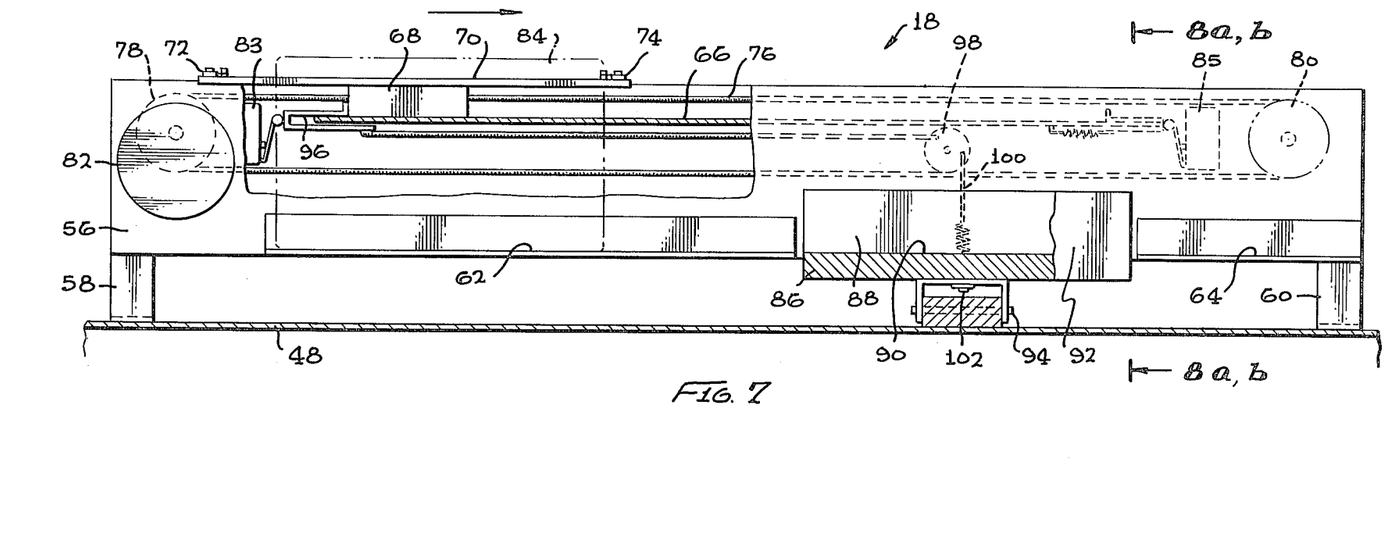
FIG. 7 is a view taken generally along the line 7—7 of FIG. 6, showing the track assembly in elevation.
Figure 9:
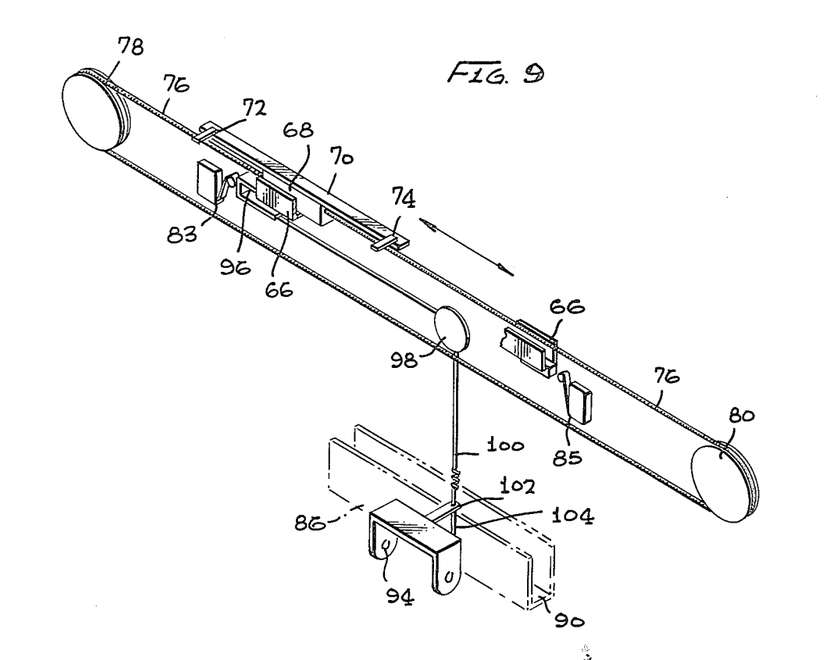
FIG. 9 is an isometric view of some of the mechanical drive equipment of the cassette changer assembly.
Figure 10:
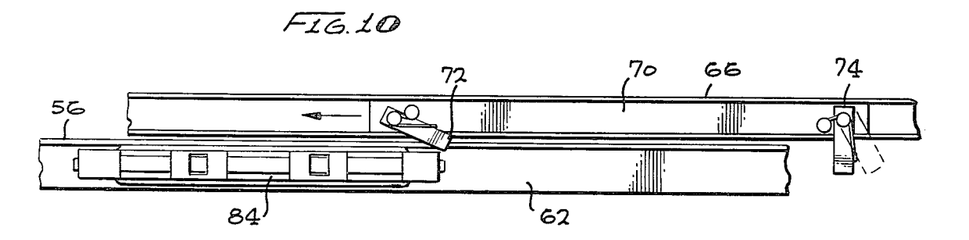
FIG. 10 is a partial view similar to FIG. 6 showing the return stroke of a portion of the changer assembly.
Figure 11C:
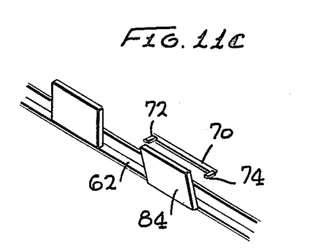
Figure 11D:
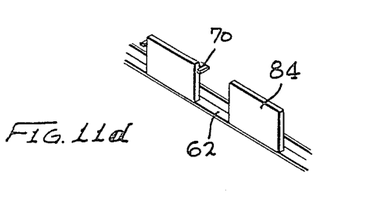
Figure 11E:
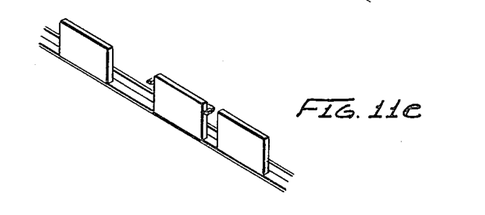

Cassette carriage 86 is pivoted on pivot pin 94, see FIGS. 8a and 8b, to swing from the cassette-receiving position of FIG. 8a wherein it is in alignment with the guide plate 56, to the upright position wherein the cassette is vertically oriented, as shown in FIG. 8b. The drive mechanism which raises cassette carriage 86 from the cassette receipt position to the upright position is connected to be operated by shuttle 68. Drive link 96, see FIGS. 7 and 9, is engaged by returning shuttle 68. As the shuttle nears its end of the stroke, it presses drive link end 96 to the left, which causes counter-clockwise rotation of disc 98, which is connected by spring 100 (see FIGS. 8a, 8b and 9) to pin 102 extending out of the back of cassette carriage 86. Return spring 104 is connected between pin 102 and base plate 48 and is weaker than spring 100. By this construction, when shuttle 68 moves drive link 96 to the left, spring 100 raises pin 102 to move the carriage from the release position of FIG. 8a to the raised position of FIG. 8b. On the return stroke of the shuttle to the left, the spring which holds finger 72 in the forward position is overcome so that the finger swings out of the way to pass the next cassette at the delivery end of magazine 14, see FIG. 10. At the same time, the forward finger 74 moves to a position where it is behind the cassette 84 now in the cassette carriage. Cassette 84 is engaged with tape transport 20 for recording thereon and is in the position shown in FIG. 11c.

The tape transport assembly 20 is shown in FIGS. 1, 2, 8a and 8b. In order to maintain the proper structural rigidity to provide sufficient accuracy for the moving parts of the tape transport assembly, the tape transport assembly is made up of front and rear plates 106 and 108 in precise parallelism to provide the necessary rigidity for the operative structure. Capstan shaft 112 is mounted on ball bearings in the plates and carries fly wheel 114. Its axis is substantially parallel to base plate 48. Capstan shaft 112 is driven by a suitable tape drive motor which includes drive wheel 116. The tape drive motor is mounted upon a bracket to the base, and a rigid tape transport assembly is formed of the front and rear plates and their spacers. Capstans 118 and 120 respectively extend through the front and rear bearings which support capstan shaft 112 and respectively engage the tape in master cassette 122 and the cassette 84 which is now in recording position. The pinch rollers, magnetic heads. As cassette 84 is moved into the active position, it engages over these indexing pins.

The pre-recorded master cassette 122 is positioned in the tape transport assembly by means of a cassette carriage similar to that used for the blank cassette, but hinged to the opposite side of the assembly. The pre-recorded cassette is manually installed, since that cassette is not normally changed during each cycle of duplication. With the single capstan shaft controlling the motion of both the pre-recorded and a blank tape during the actual process of duplication, positive synchronization is achieved. This positive synchronization between the two tapes is accomplished during duplication without the need for electrical synchronization or any additional mechanical synchronizing elements. In this way, accurate recording is achieved.

When recording is complete, changer assembly 18 is signaled to go through another cycle. First, movement of the shuttle causes cassette cartridge 86 to move from the active position shown in FIG. 8b to the cassette-change position shown in FIG. 8a. Thereupon, finger 74 engages upon cassette 84 moving it out of cassette carriage 86 and onto outlet track 64 where it may extend out of outlet slot 124, see FIG. 1, for retrieval. The next cycling advance pushes the cassette completely out of duplicator 10. In this way, repetitive recording from a single master onto sequential duplicate cassettes is achieved.

This invention having been described in its preferred embodiment, it is clear that it is susceptible to numerous modifications and embodiments within the ability of those skilled in the art and without the excerise of the inventive faculty. Accordingly, the scope of this invention is defined by the scope of the following claims.

What is claimed is:

1. A cassette-to-cassette duplicator comprising:
   a base;
   a magazine assembly mounted on said base, said magazine assembly being for the sequential feeding of duplicate cassettes, each including magnetic tape, for the sequential recording of information on the magnetic tapes therein;
   a changer assembly mounted on said base and positioned to receive cassettes from said magazine assembly, said changer assembly having means thereon for moving duplicate cassettes from a cassette receiving position to a cassette recording position; and
   a tape transport, said tape transport including a cassette carriage into which a duplicate cassette is delivered by said changer assembly, said tape transport having a tape recording position into which said cassette carriage delivers a duplicate cassette, said tape transport also having a separate cassette playback position at which a master cassette can be played back, said tape transport having drive means for driving both the master cassette and the duplicate cassette delivered by said cassette carriage so that information pre-recorded on said master cassette can be recorded onto said duplicate cassette;
   said magazine assembly comprising a magazine receiver mounted on said base and a magazine detachably mounted therein, said magazine being for containing a plurality of magnetic tape-containing duplicate cassettes for delivering them sequentially to said changer assembly, said magazine being mounted at an acute angle relative to the horizontal so said duplicate cassettes are urged by gravity toward said changer assembly at a force determined by said angle.

2. The cassette-to-cassette duplicator of claim 1 wherein:
   said magazine has side walls and a bottom and has a flexible conveyor belt slidably mounted thereon for urging cassettes toward said changer assembly.

3. The cassette-to-cassette duplicator of claim 2 wherein:
   a constant tension spring is connected to said conveyor belt to resiliently urge duplicate cassettes toward the discharge end of said magazine.

4. A cassette-to-cassette duplicator comprising:
   a base;
   a magazine assembly mounted on said base, said magazine assembly being for the sequential feeding of duplicate cassettes, each including magnetic tape, for the sequential recording of information on the magnetic tapes therein;

a changer assembly mounted on said base and positioned to receive cassettes from said magazine assembly, said changer assembly having means thereon for moving duplicate cassettes from a cassette receiving position to a cassette recording position;

said magazine assembly comprising a magazine receiver mounted on said base and a magazine detachably mounted therein, said magazine being for containing a plurality of magnetic tape containing duplicate cassettes for delivering them sequentially to said receiving position on said changer assembly, said magazine having a floor and said floor being acutely angled with respect to said base at an angle between 5 and 30 degrees, said duplicator having a front and having a back, with said floor being angled downwardly in said duplicator from said front toward said back; and a tape transport, said tape transport including a cassette carriage into which a duplicate cassette is delivered by said changer assembly, said tape transport having a tape recording position into which said cassette carriage delivers a duplicate cassette, said tape transport also having a separate cassette playback position at which a master cassette can be played back, said tape transport having drive means for driving both the master cassette and the duplicate cassette delivered by said cassette carriage so that information pre-recorded on said master cassette can be recorded onto said duplicate cassette.

5. A cassette-to-cassette duplicator comprising:
a base;
a magazine assembly mounted on said base, said magazine assembly being for the sequential feeding of duplicate cassettes, each including magnetic tape, for the sequential recording of information on the magnetic tapes therein;

a changer assembly mounted on said base and positioned to receive cassettes from said magazine assembly, said changer assembly having means thereon for moving duplicate cassettes from a cassette receiving position to a cassette recording position; and a tape transport, said tape transport including a cassette carriage into which a duplicate cassette is delivered by said changer assembly, said tape transport having a tape recording position into which said cassette carriage delivers a duplicate cassette, said tape transport also having a separate cassette playback position at which a master cassette can be played back, said tape transport having drive means for driving both the master cassette and the duplicate cassette is delivered by said cassette carriage so that information pre-recorded on said master cassette can be recorded onto said duplicate cassette;

said changer assembly comprising a track, said track extending from a position adjacent the receiving position at the discharge end of said magazine assembly to a position adjacent said tape transport, said tape transport having a capstan rotatable on an axis, said track being oriented with respect to said base to move a cassette from said magazine assembly toward said tape transport and oriented to an acute angle between 5 and 30 degrees with respect to a plane normal to said axis so that said cassette is so oriented during such movement.

6. A cassette-to-cassette duplicator comprising:
a base;
a magazine assembly mounted on said base, said magazine assembly being for the sequential feeding of duplicate cassettes, each including magnetic tape, for the sequential recording of information on the magnetic tapes therein;

a changer assembly mounted on said base and positioned to receive cassettes from said magazine assembly, said changer assembly having means thereon for moving duplicate cassettes from a cassette receiving position to a cassette recording position;

said magazine assembly comprising a magazine receiver mounted on said base and a magazine detachably mounted therein, said magazine being for containing a plurality of magnetic tape containing duplicate cassettes for delivering them sequentially to said receiving position on said changer assembly, said magazine having side walls and a bottom and having a flexible conveyor belt slidably mounted thereon for urging cassettes toward said changer assembly;

said magazine receiver having a bottom and said magazine having a cassette follower and an eye below said magazine floor and above said bottom, said conveyor belt interconnecting said follower and eye, a tension cable, a spring connected to said tension cable, said tension cable having a hook at one end above said bottom and engaging said eye so as to resiliently urge said conveyor belt to discharge cassettes from said magazine and also urge said follower to keep said cassettes upright, said eye being disconnectable from said hook so that said magazine can be detached and removed from said magazine receiver; and a tape transport, said tape transport including a cassette carriage into which a duplicate cassette is delivered by said changer assembly, said tape transport having a tape recording position into which said cassette carriage delivers a duplicate cassette, said tape transport also having a separate cassette playback position at which a master cassette can be played back, said tape transport having drive means for driving both the master cassette and the duplicate cassette delivered by said cassette carriage so that information pre-recorded on said master cassette can be recorded onto said duplicate cassette.

7. The cassette-to-cassette duplicator of claim 6 wherein:
said magazine has a floor and said floor is acutely angled with respect to said base at an angle between 5 and 30 degrees, said duplicator having a front and having a back, with said floor being angled downwardly in said duplicator from said front toward said back.

8. The cassette-to-cassette duplicator of claim 7 wherein:
said changer assembly comprises a track, said track extending from a position adjacent the receiving position at the discharge end of said magazine assembly to a position adjacent said tape transport, said tape transport having a capstan rotatable on an axis, said track being oriented with respect to said base to move a cassette from said magazine assembly toward said tape transport and oriented to an acute angle between 5 and 30 degrees with respect to a plane normal to said axis.

9. The cassette-to-cassette duplicator of claim 8 or 5 wherein:
said track is mounted on a guide plate which is mounted on said base, and a shuttle is mounted to be movable in a direction along said track, said shuttle having engagement means thereon for engaging a cassette on said track for moving the cassette along said track.

10. The cassette-to-cassette duplicator of claim 9 wherein:
said cassette engagement means comprises finger means, said finger means being resiliently mounted with respect to said shuttle so that said finger means can advance a cassette while said shuttle is moving in an advance direction and pass a cassette while said shuttle is moving in a return direction.

11. The cassette-to-cassette duplicator of claim 10 wherein:
said finger means comprises first and second fingers;
said first finger engages a first duplicate cassette at said receiving position on said changer assembly for moving said first duplicate cassette to said position adjacent said tape transport;
said second finger engages said first duplicate cassette at said position adjacent said tape transport, after said first duplicate cassette has been returned thereto subsequent to recording, for moving said first duplicate cassette to a cassette discharge position; and
said first finger engages a second duplicate cassette at said receiving position on said changer assembly for moving said second duplicate cassette to said position adjacent said tape transport while said second finger is moving said first duplicate cassette to said cassette discharge position.

12. The cassette-to-cassette duplicator of claim 11 wherein:
said shuttle is mounted in a channel and said channel is mounted on said guide plate so that said finger means extend over said guide plate to engage a cassette.

13. The cassette-to-cassette duplicator of claim 8 or 5 wherein:
said tape transport includes a cassette carriage, said cassette carriage being pivotally mounted on said base and movable from a cassette receiving position to a cassette recording position, said cassette carriage being in line with said track when in its cassette receiving position.

14. The cassette-to-cassette duplicator of claim 13 wherein:
a cassette on said track and on said cassette carriage can move past said capstan when said cassette carriage is in its cassette receiving position and the cassette is engaged on said capstan when said carriage is moved to its cassette recording position.

15. The cassette-to-cassette duplicator of claim 14 wherein:
said changer has a shuttle therein for moving a cassette from adjacent said magazine assembly to said cassette carriage and said shuttle is connected to said cassette carriage so that, when said shuttle is in one position, said cassette carriage is in a cassette receiving position and, when said shuttle is in another position, said cassette carriage is in a cassette recording position.

16. The cassette-to-cassette duplicator of claim 15 wherein:
a drive link is positioned to be engaged by said shuttle and actuated when said shuttle is in its retracted position where it can advance a cassette from adjacent said magazine assembly, said drive link being connected to said cassette carriage so that, when said shuttle is in its retracted position, said cassette carriage is in its cassette recording position.

17. The cassette-to-cassette duplicator of claim 16 wherein:
said shuttle has first and second fingers thereon for engaging cassettes on said track for moving cassettes along said track;
said first finger engages a first duplicate cassette at said receiving position on said changer assembly for moving said first duplicate cassette to said position adjacent said tape transport;
said second finger engages said first duplicate cassette at said position adjacent said tape transport, after said first duplicate cassette has been returned thereto subsequent to recording, for moving said first duplicate cassette to a cassette discharge position; and
said first finger engages a second duplicate cassette at said receiving position on said changer assembly for moving said second duplicate cassette to said position adjacent said tape transport while said second finger is moving said first duplicate cassette to said cassette discharge position.

18. A cassette-to-cassette duplicator comprising:
a base;
a magazine assembly mounted on said base, said magazine assembly being for the sequential feeding of duplicate cassettes, each including magnetic tape, for the sequential recording of information on the magnetic tapes therein;
a changer assembly mounted on said base and positioned to receive cassettes from said magazine assembly, said changer assembly having means thereon for moving duplicate cassettes from a cassette receiving position to a cassette recording position; and
a tape transport, said tape transport including a cassette carriage into which a duplicate cassette is delivered by said changer assembly, said tape transport having a tape recording position into which said cassette carriage delivers a duplicate cassette, said tape transport also having a separate cassette playback position at which a master cassette can be played back, said tape transport having drive means for driving both the master cassette and the duplicate cassette delivered by said cassette carriage so that information pre-recorded on said master cassette can be recorded onto said duplicate cassette, said tape transport having a rotatable capstan therein, said rotatable capstan defining an axis, said cassette carriage being positioned adjacent said capstan so that movement of said cassette carriage moves a cassette into engagement position by said capstan.

19. The cassette-to-cassette duplicator of claim 18 wherein:
said cassette carriage moves from a cassette receiving position to a cassette recording position, said cassette carriage being pivoted with respect to said base so that in its cassette receiving position it is positioned at an acute angle between 5 and 30 degrees with respect to normal from said axis to its position when said capstan can engage said cassette when said cassette carriage is at a position substantially normal to said axis.

20. The cassette-to-cassette duplicator of claim 19 wherein:

said cassette carriage is channel-shaped having a resiliently mounted side wall for engaging a cassette.

21. The cassette-to-cassette duplicator of claim 20 wherein:

said tape transport has a single capstan shaft and has a capstan extending on each end thereof, said capstans respectively being for engaging tape in a master tape cassette in a tape playback position and tape in a receiving tape cassette in a tape recording position in said cassette carriage.

22. The cassette-to-cassette duplicator of claim 21 wherein:

said capstan shaft is rotatably mounted in first and second tape transport assembly plates which are rigidly spaced from each other to firmly support said capstan shaft.

* * * * *